United States Patent Office 3,284,234
Patented Nov. 8, 1966

3,284,234
STABILIZED CELLULOSIC MATERIAL
Laurence R. B. Hervey, West Concord, and Richard P. Tschirch, Westwood, Mass., assignors, by mesne assignments, to Olin Mathieson Chemical Corporation, New York, N.Y., a corporation of Virginia
No Drawing. Filed Sept. 3, 1963, Ser. No. 306,287
8 Claims. (Cl. 117—154)

The present invention relates to the stabilization of cellulosic materials. More particularly, the present invention resides in a process for the stabilization of cellulosic materials utilizing certain hydrazine-containing compounds and to the stabilized cellulosic materials thereby obtained.

Cellulosic materials are widely used in industry and commerce, due in a large part to their low cost and wide availability. Certain disadvantages are, however, attendant upon their use for certain applications, namely, thermal stability and stability upon exposure to corrosive materials.

An illustrative application where this type of property is essential is in transformer boards. A transformer board is a paper board used as an insulation barrier in oil immersion transformers. This board is subject both to thermal degradation and attack by acids formed in the oils as they age. Thus, it is highly desirable that the cellulosic board be capable of considerable resistance to this type of corrosion. In addition, it is highly desirable to provide paper products and cotton fiber products and various other cellulosic products which are resistant to elevated temperatures for extended periods of time. The advantages of such a stabilized product are readily apparent when the wide and considerable use of these products is realized.

Increasing the thermal stability of paper is of particular importance in electrical applications, for example, in paper tapes which should retain their strength and pliability during long exposure to elevated temperatures. Another application for a thermally stable paper product is in publication paper printing with heat set inks. In printing with heat set inks the paper becomes very hot and thus embrittled. This embrittlement causes difficulties when the printed paper web is subsequently folded in the fabrication of books and magazines. In addition, it is, of course, highly desirable to improve the long term stability of paper at room temperatures in an application, for example, such as the preservation of documents. A further application for stabilized cellulosic products is in the stabilization of such products as rayon tire cord which by necessity is subjected to rigorous use conditions. The foregoing are merely typical applications where this type of stability is necessary.

Numerous materials have been suggested as stabilizers for cellulosic materials to overcome the foregoing disadvantages. However, generally these materials have one or more disadvantages, for example, the level of stability may be low, there may be accompanying degradation of other properties, for example, color degradation which is especially important in certain areas, and the cost of the stabilizer may be prohibitively high.

Accordingly, it is an object of the present invention to provide a process for the stabilization of cellulosic products in general, and a stabilized cellulosic material.

It is a further and particular object of the present invention to provide a simple, convenient, expeditious and inexpensive process and stabilized product as aforesaid.

It is a further object of the present invention to provide a process with particular reference to the foregoing problems in the use of cellulosic materials, namely, a process that achieves a cellulosic material having improved thermal and corrosion stability.

It is a further object of the present invention to provide a process which is characterized by little or no degradation of the physical or chemical characteristics of the cellulose, for example, color stability.

Further objects and advantages of the present invention will appear hereinafter.

In accordance with the present invention is has now been found that the foregoing objects and advantages may be readily accomplished and a process obtained for the stabilization of cellulosic materials. In addition, the present invention obtains a stabilized cellulosic material having surprisingly improved properties.

The process of the present invention comprises contacting the cellulosic material to be stabilized with at least 0.1 and preferably from 0.5 to 15 percent by weight of cellulosic material and optimally from 1 to 9 percent of a hydrazide selected from the group consisting of the following compounds and mixtures thereof:

(I) $RCONHNH_2$
(II) $RCONHNHCOR$
(III) $R'(CONHNH_2)_2$ wherein each R is independently selected from the group consisting of hydrogen and alkyl containing from 1 to 8 carbon atoms and wherein R' is selected from the group consisting of $(-CH_2-)_n$, wherein $n$ is an integer having a value of 0–5, and an alkylene of 2–6 carbon atoms interrupted by from 1 to 2 atoms selected from the group consisting of oxygen and sulfur. The stabilized cellulosic material of the present invention comprises a cellulosic material having said hydrazide in an amount of at least 0.1 percent by weight of cellulosic material incorporated therein.

As aforesaid the process of the present invention comprises simply contacting the cellulosic material with the requisite quantity of the stabilizer of the present invention. Naturally the choice of specific method of contact will vary widely depending upon the application and the particular cellulosic material employed, e.g., in the stabilization of transformer boards, it is possible to simply add the stabilizer or stabilizers to the oil or incorporate them in the board itself in some stage of its formation. In the stabilization of paper sheets or cellulosic textiles, the sheets or textiles may be impregnated to the desired dry pickup with aqueous solutions of the desired chemical, run through rubber rolls and air dried. Alternatively, the stabilizer may be incorporated in the cellulosic paper or textile in some preliminary stage of its formation. The foregoing is simply intended to be illustrative of the fact that the specific manner of contacting is not especially critical. It is required only that the chosen cellulosic material be contacted with or impregnated with or immersed in the requisite concentration of stabilizer of the present invention, for example, by dipping in either a solution or suspension of the desired stabilizer or spraying, etc.

In accordance with the present invention the cellulosic material is contacted with at least 0.1 percent by weight of the cellulosic material of one or more stabilizers of the present invention. Naturally, the particular quantity of stabilizer employed will vary depending upon the particular application desired, the particular cellulosic material and the particular stabilizer. The upper amount is not especially critical, being limited only by economic factors, the particular application desired, and the particular stabilizer. In general, however, from 0.5 to 15 percent is employed, and optimally from 1 to 9 percent by weight of the cellulosic material.

The particular stabilizer of the present invention may be any mono- or di-hydrazide or mixtures thereof having the aforesaid structural formulas, namely, (I) $\qquad$ RCONHNH$_2$
(II) $\qquad$ RCONHNHCOR
(III) $\qquad$ R'(CONHNH$_2$)$_2$ wherein each R is independently selected from the group consisting of hydrogen and alkyl containing from 1 to 8 carbon atoms and wherein R' is selected from the group consisting of (—CH$_2$—)$_n$, wherein $n$ is an integer having a value of 0–5, and an alkylene of 2–6 carbon atoms interrupted by from 1 to 2 atoms selected from the group consisting of oxygen and sulfur. Exemplificative dihydrazides which may be readily employed include, but are not limited to, the following: oxalic dihydrazide, malonic dihydrazide, succinic dihydrazide, glutaric dihydrazide, adipic dihydrazide, pimelic dihydrazide, diglycolic dihydrazide, thiodiglycolic dihydrazide, etc. Examples of representative hydrazides of monobasic acids include, but are not limited to, acetic hydrazide, diformic hydrazide, diacetic hydrazide, propionic hydrazide, etc.

Especially preferred stabilizers in accordance with the present invention in view of their activity and availability are acetic hydrazide, adipic dihydrazide and diglycolic dihydrazide.

It is a surprising feature of the present invention that the stabilizers presently employed so significantly improve the stability of cellulosic materials in the entire range of compounds covered herein. It is especially surprising that the stabilizers of the present invention are generally superior to conventional stabilizers employed for this purpose, such as, for example, dicyandiamide. It is further especially surprising that the stabilizers of the subject invention are markedly superior to, for example, dicyandiamide, with respect to color stability.

The stabilizer of the present invention may be conveniently utilized, as indicated above, in an aqueous solution or in any other medium suitable to the particular application desired. In addition the aqueous or other solution may be modified for particular results with, for example, alcohols, wetting agents, etc. If desired, conventional additives may be employed to achieve particular results, depending again upon the particular application.

The present invention will be more readily apparent from a consideration of the following illustrative examples.

EXAMPLE 1

A stabilizer mixture for oil immersion transformer board was prepared by mixing thoroughly 60 parts by weight of a hydrazide (see table below), 35 parts of melamine and 5 parts of an acrylic acid-acrylamide copolymer.

Into 160 grams of a commercial transformer oil was introduced 0.34 gram of the above stabilizer mixture and the whole was heated to 175° C.

Test strips were cut in the cross machine direction from 100 percent rag stock board 15 mils thick. The ½ x 4 inch strips were immersed in the heated oil for 70 hours. The strips were removed, excess oil wiped off, conditioned by storing for 24 hours at 68° F. and 50 percent relative humidity.

The average tensile strength of the test strips was determined as follows:

Table 1

| Hydrazide: | Tensile strength retained, percent of original |
|---|---|
| None | 54 |
| Acetic hydrazide | 82 |
| Adipic dihydrazide | 80 |
| Dicyandiamide | 71 |

*Example 2*

The procedure of Example 1 was repeated and the tensile strengths were measured on strips cut in the machine direction of the board with the following results:

Table 2

| Hydrazide: | Tensile strength retained percent of original |
|---|---|
| None | 34 |
| Adipic dihydrazide | 39 |
| Acetic hydrazide | 50 |

*Example 3*

Unsized rag paper sheets were impregnated with aqueous solutions of various hydrazides and dried to add 5 percent dry pickup of hydrazide. The sheets were aged in an air-circulating oven at 300° F. for 24 hours, conditioned at 68° F. and 50 percent relative humidity for 24 hours, and the fold endurance was measured, with the following results:

Table 3

| Hydrazide: | Fold endurance retained, percent of original |
|---|---|
| None | 3.9 |
| Adipic dihydrazide | 38 |

The data of this accelerated test show a significant improvement in fold endurance by the incorporation of the hydrazides and are an indication of the improvement obtained in long term aging of paper at normal temperatures.

*Example 4*

Strips of 1 x 8 inch unbleached cotton cloth were saturated with 3.4 percent aqueous solutions of the hydrazides, squeezed through rubber rolls and air dried. Dry pickup was 5 percent. The strips were heated in an air-circulating oven at 300° F. for 24 and 72 hours. The strips were conditioned at 68° F. and 50 percent relative humidity for 24 hours and then the tensile strengths were measured, with the following results:

Table 4

| Hydrazide | Tensile Strength Retained, Percent of Original | |
|---|---|---|
|  | 24 Hours | 72 Hours |
| None | 63 | 45 |
| Diformic Hydrazide | 73 | 59 |
| Diacetic Hydrazide | 73 | 47 |
| Adipic Dihydrazide | 68 | 61 |

*Example 5*

The procedure of Example 3 was repeated with the following results:

Table 5

| Hydrazide | Fold Endurance Retained, Percent of Original | | | Tensile Strength Retained Percent of Original After 72 Hours |
|---|---|---|---|---|
|  | 24 Hours | 48 Hours | 72 Hours |  |
| None | 5 | 1 | 0.3 | 70 |
| Diglycolic Dihydrazide | 32 | 13 | 9 | 81 |
| Acetic Hydrazide | 16 | 6 | 1 | 78 |
| Acetic Hydrazide 60% Melamine 35% Polyacrylamide 5% | 20 | 5 | 2 | 78 |

EXAMPLE 6

The following example shows the surprising color stability attained in accordance with the present invention. In this example unsized rag paper sheets were treated as in Example 3 except that the sheets were aged at 300° F. for 72 hours. Color degradation was observed with the following results: the least discolored sample was the paper sheet with no stabilizer added; paper sheet with the following stabilizers added showed good color retention, although not as good as the control, adipic dihydrazide,
diacetic hydrazide,
diformic hydrazide;

paper sheet treated with dicyandiamide had a generally darker color and was spotty.

Similar results were obtained with the unbleached cotton cloth treated in accordance with Example 4 (after 72 hours aging), i.e., samples treated with dicyandiamide showed severe color degradation; whereas, hydrazide treated samples showed good color retention.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A stabilized cellulosic material which comprises a cellulosic material impregnated with at least 0.1 percent by weight of the cellulosic material of a hydrazide selected from the group consisting of the following compounds and mixtures thereof:

(I) $RCONHNH_2$
(II) $RCONHNHCOR$
(III) $R'(CONHNH_2)_2$ wherein each R is independently selected from the group consisting of hydrogen and alkyl containing from 1 to 8 carbon atoms and wherein R' is selected from the group consisting of $(-CH_2-)_n$, wherein $n$ is an integer having a value of 0 to 5 and an alkylene of 2 to 6 carbon atoms interrupted by from 1 to 2 atoms selected from the group consisting of oxygen and sulfur.

2. A stabilized cellulosic material according to claim 1 wherein from 0.5 to 15 percent by weight of said hydrazide is employed.

3. A stabilized cellulosic material according to claim 1, wherein said hydrazide is acetic hydrazide.

4. A stabilized cellulosic material according to claim 1, wherein said hydrazide is adipic dihydrazide.

5. A stabilized cellulosic material according to claim 1, wherein said hydrazide is diglycolic dihydrazide.

6. A stabilized cellulosic material according to claim 1 wherein said cellulosic material is transformer board and wherein said hydrazide is present in an amount from 0.5 to 15% by weight.

7. A stabilized cellulosic material according to claim 1, wherein said cellulosic material is paper and wherein said hydrazide is present in an amount from 0.5 to 15% by weight.

8. A stabilized cellulosic material according to claim 1, wherein said cellulosic material is textile and wherein said hydrazide is present in an amount from 0.5 to 15% by weight.

References Cited by the Examiner

UNITED STATES PATENTS

| | | | |
|---|---|---|---|
| 2,050,196 | 8/1936 | Sebrell | 117—136 |
| 2,161,808 | 6/1939 | Finlayson et al. | 117—139.4 |
| 2,665,230 | 1/1954 | Buckwalter | 117—144 |
| 2,904,387 | 9/1959 | Holbrook et al. | 117—139.4 X |
| 2,904,389 | 9/1959 | Thomas et al. | 117—139.4 X |
| 2,904,390 | 9/1959 | Doerr et al. | 117—139 X |
| 3,230,107 | 1/1966 | Sadler | 117—154 X |

WILLIAM D. MARTIN, *Primary Examiner.*

T. G. DAVIS, *Assistant Examiner.*